Oct. 15, 1968  K. KUPFERBERG ETAL  3,406,341
DYNAMIC LOADS FOR TESTING REGULATED POWER SUPPLIES
Filed April 15, 1965  2 Sheets-Sheet 1

INVENTOR.
KENNETH KUPFERBERG
PAUL BIRMAN
BY
*Alfred W. Barber*
ATTORNEY

United States Patent Office 3,406,341
Patented Oct. 15, 1968

3,406,341
DYNAMIC LOADS FOR TESTING REGULATED POWER SUPPLIES
Kenneth Kupferberg and Paul J. Birman, Flushing, N.Y., assignors to Forbro Design Corp., New York, N.Y., a corporation of New York
Filed Apr. 15, 1965, Ser. No. 448,394
6 Claims. (Cl. 324—158)

The present invention concerns methods of and means for testing regulated power supplies and, in particular, electronic loads therefor.

Regulated power supplies fall into two broad classes; voltage regulated and current regulated. Such power supplies are available covering a wide range of voltages and currents. In order to test such power supplies it is necessary to load them with appropriate resistors capable of being adjusted over a wide range of values and capable of dissipating power up to the maximum rating of the largest power supply. Where a wide range of power supplies are to be tested, a great variety of test resistors will be required. Variable resistors may be used in some cases but may not be satisfactory due to problems with varying contact resistance of the slider, tap switch or other device used for providing the variation.

The present invention concerns an electronic loading device which is capable of assuming a wide range of apparent load resistance values. This electronic loading device utilizes a fixed resistor, a voltage regulated power supply and a current regulated power supply. In order to test a voltage regulated power supply, the test device is connected to provide a controlled current load. To test a current regulated power supply, the test device is connected to provide a controlled voltage load. The use of precision regulated power supplies in the test device permits the simulation of very stable load conditions, thereby eliminating problems encountered with load resistance changes due to heating of a load resistor or noise encountered with imperfect contacts in a variable resistance device. A major characteristic of such an electronic test device (load) is that it overcomes serious limitations of simple resistor loading when testing (loading) power supplies. In particular, for conventional resistance loads, the load current (from a voltage regulator) is $$I_{load} = \frac{E_{ou'pt}}{R_{load}}$$

or the load voltage (from a current regulator) is $E_{load}=(I_{output})(R_{load})$. In both cases the load depends on the output setting of the device at hand. For testing purposes, where it is desired to achieve a particular load for a variety of output settings, a variety of loading resistors is needed or a power rheostat (adjustable) resistance is required. The present invention permits the operator to independently select voltage and current without changing the load resistor so that a selected load (voltage or current) can be maintained irrespective of the output setting. A further advantage is possible with the electronic test device in that remote programming of the load is possible so that remote controlled tests can be made. Simple switching provisions may be included to permit a changeover from one type of load to the other.

Accordingly, one object of the present invention is to provide methods of and means for providing electronic test devices for voltage or current regulated power supplies.

Another object is to provide a remotely programmable test device for regulated power supplies.

A further object is to provide an electronic test device for regulated power supplies which can be quickly and easily switched from voltage mode loading to current mode loading.

Still another object is to provide an electronic load for regulated power supplies which have selectable constant current or constant voltage characteristics.

These and other objects will be apparent from the detailed description of the invention given in connection with the various figures of the drawing.

Figure 1:
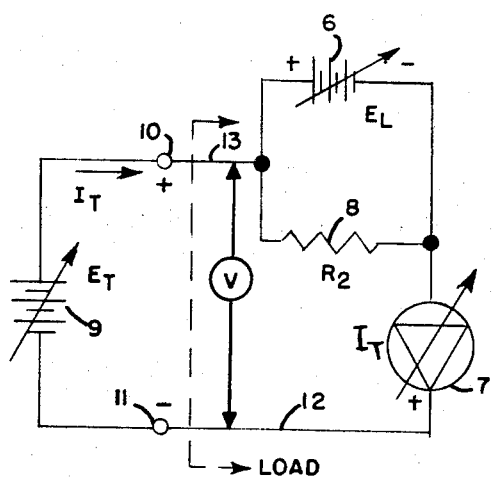
FIGURE 1 is a diagrammatic representation of one form of the present invention used as a load for a voltage regulated power supply.

FIGURE 1 shows the present invention as applied to testing of a voltage regulated power supply. The voltage regulated device 9 to be tested is represented with positive terminal 10 and negative output terminal 11. The electronic test load consists of a controllable regulated voltage source 6 pre-loaded by resistor 8 and in series with a controllable regulated current source 7. This electronic load is connected by means of leads 12 and 13 across output terminals 10 and 11 of the voltage regulated device 9 to be tested.

The voltage $E_L$ of source 6 is chosen to be equal to or greater than maximum voltage of voltage regulated device 9 under test. The apparent load across terminals 10 and 11 will be equal to $R=E_T/I_T$ where $E_T$ is the test output voltage of device 9 and $I_T$ is the regulated current from regulated current source 7. Because the apparent load resistance R is a function of the source $E_T$ being loaded, $E_T$, ($R=E_T/I_T$), the apparent value of R varies with $E_T$, such that $I_T$ appears constant and does not vary with $E_T$, as would the load current drawn by a simple resistance load. The load current is always equal to $I_T$, which is independent of $E_T$. Thus, the regulated current source 7 is made adjustable up to the maximum current required to be drawn from device 9. The resistor 8 must have a resistance not greater than that which will draw this maximum current from voltage source 6. This will insure a positive current flow from regulated device 9 under all proposed test conditions. The apparent load on device 9 can then be varied by varying the current from source 7. This then provides a constant current load or a voltage regulated power supply. Once $I_T$ is set, a complete range $E_T$ can be covered. Since R automatically changes in accordance with the formula $R=E_T/I_T$. If source 7 is chosen to be a remotely programmable current regulated source, the programming of the electronic test load may be carried on from a remote point. This electronic test load thus provides a constant current load for a voltage regulated power supply which can be adjusted over a wide range, requires only one fixed power dissipating resistor and at the same time maintains a constant dissipation in this resistor due to the constant voltage from source 6. No variable contacts are required for this load to assume a wide range of apparent values.

Figure 2:
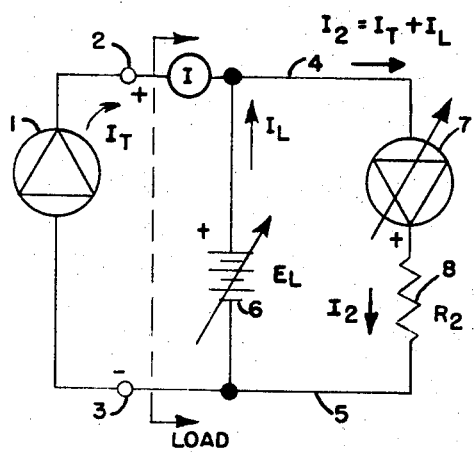
FIGURE 2 is a diagrammatic representation of another form of the present invention used as a load for a current regulated power supply.

FIGURE 2 shows the present invention as applied to testing of a current regulated power supply. The power supply 1 is symbolically represented as a current source and is intended to represent a current regulated power supply under test. Power supply 1 under test is provided with output terminals 2 and 3 in which terminal 2 is the positive and terminal 3 is the negative terminal. The electronic load includes a voltage regulated device 6 shunted by a current regulated device 7 in series with a resistor 8. The range of voltage regulated device 6 is made sufficient to cover the range of apparent load resistance to be used in testing current regulator 1 where $R=E_L/I_T$, R being the apparent load resistance, $I_T$ being the programmed current from current regulator $l$ and $E_L$ being the programmable regulated voltage from source 6. The regulated current from current regulator 7 is chosen to be greater than any current $I_T$ to be drawn from current regulator $l$ under test so that a positive current will be drawn from voltage regulated source 6 under all test conditions. This electronic load is connected across terminals 2 and 3. Now with this electronic load, the regulated current from the device 1 under test may be set to any value up to a maximum of $I_2$ and the apparent load resistance may be varied over a wide range simply by changing the voltage of regulated voltage 6. The value of resistor 8 and the current setting of regulated current device 7 may remain fixed providing a constant dissipation in resistor 8. By using a voltage regulated device 6 having remote programming capabilities, the testing may be carried out by remote control. A constant voltage and load condition will be maintained across terminals 2 and 3 although resistor 8 may vary as, for example, due to heating effects.

Figure 3:
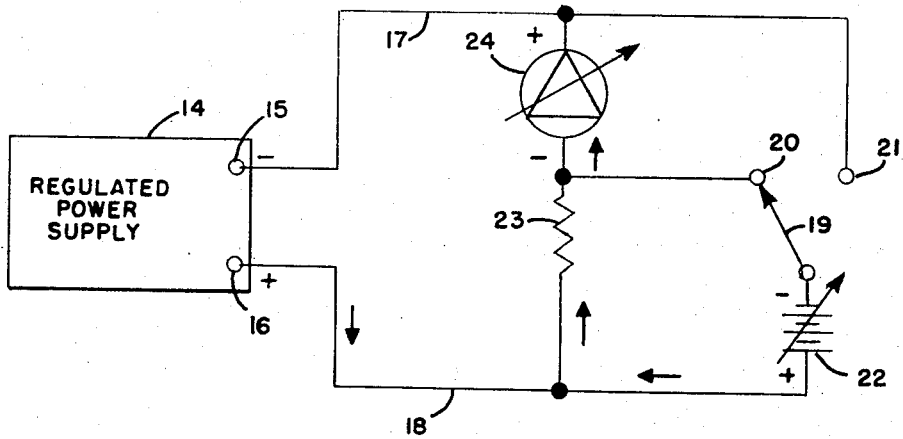
FIGURE 3 is a combination of the two forms of the present invention including a switch for switching from one mode to the other.

The electronic test system may be provided with a switch which permits using the three components, the resistor, voltage regulated source and current regulated source to test either voltage regulated devices or current regulated devices as shown in FIG. 3. The regulated power supply 14 having output terminals 15 and 16 to be tested may be either a voltage regulated device or a current regulated device. The electronic test circuit includes resistor 23, current regulated source 24, voltage regulated source 22 and changeover switch 19–20–21. Terminal 15 is connected over lead 17 to switch terminal 21. Terminal 16 is connected over lead 18 to one end of resistor 23 and to the positive side of regulated voltage source 22. Regulated current source 24 and resistor 23 are connected in series across leads 17 and 18. The negative side of regulated voltage source 22 is connected to arm 19 of the switch. Switch contact 20 is connected to the junction between regulated current source 24 and resistor 23. When switch arm 19 is closed to contact 20, this electronic load assumes the regulated voltage device test circuit as shown in FIG. 1 and described in detail above. When switch arm 19 is closed to contact 21, this electronic load assumes the regulated current device test circuit as shown in FIG. 2 and described in detail above.

Figure 4:
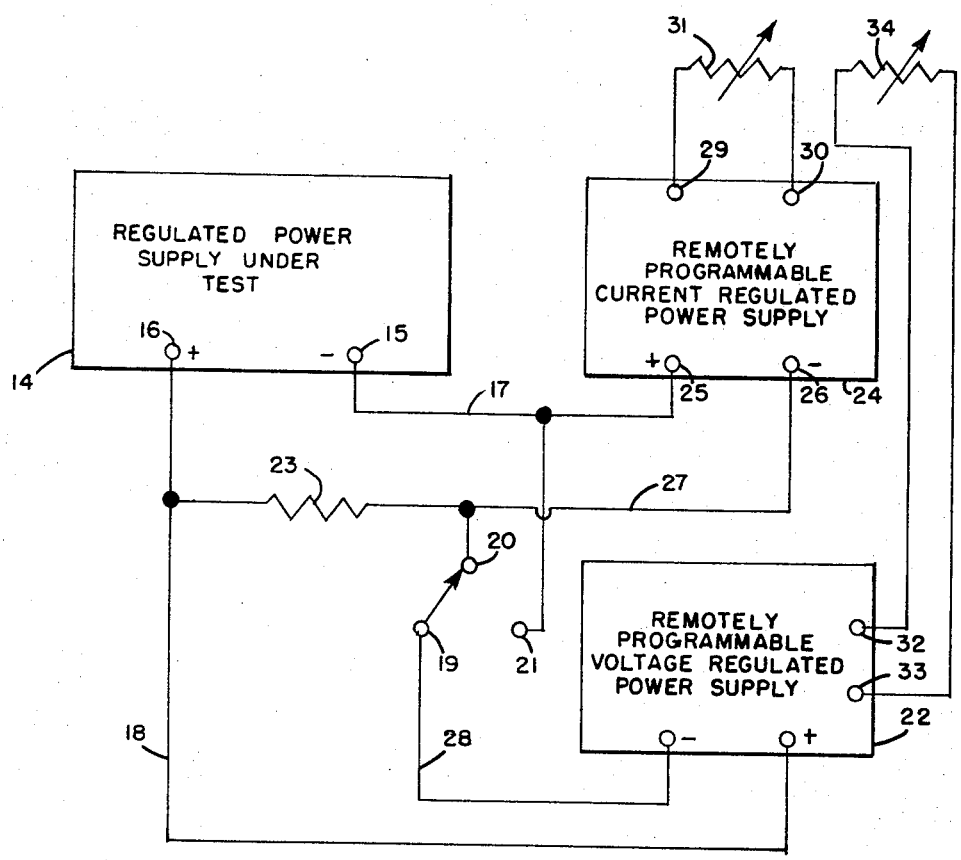
FIGURE 4 is a combination of the two forms of loading with switch-over and remote programming provisions.

FIG. 4 shows the same test circuit as that of FIG. 3 with corresponding parts bearing the same number designations but with the addition of remote programming means. The regulated current source 24 has output terminals 25 and 26 and programming terminals 29 and 30. Assuming that the regulated current source 24 is programmable by means of resistance, variable programming resistor 31 is connected across programming terminals 29 and 30. Similarly the regulated voltage source 22 is resistance programmable and is provided with programming terminals 32 and 33 across which is connected the variable programming resistor 34. These programming resistors may be remotely located so that the entire test procedure may be carried out from a remote position.

Regulated voltage source and regulated current source power supplies having programming capabilities as described are typically controlled by high resolution, precision multi-turn rheostat connected potentiometers operating at very small power levels. One effect of the present invention is to allow the resolution and precision of such low power controls to govern the characteristics of the apparent load resistance $R=E_I/I_T$ while the electronic device which simulates R dissipates very substantial amounts of power. Such precision, resolution and control is impossible with conventional loads.

While only a few forms of the present invention have been shown and described, many modifications will be apparent to those skilled in the art and within the spirit and scope of the invention as set forth in particular in the appended claims.

What is claimed is:
1. A dynamic load for testing regulated power supplies including the combination of;
 a pair of input terminals to be connected to the regulated power supply under test;
 a power resistor and a current regulated power supply connected in series circuit across said terminals;
 and a voltage regulated power supply connected across at least a portion of said series circuit whereby predetermined test load conditions are provided between said terminals for dynamic loading of a regulated power supply, and whereby the output of the regulated power supply under test may be indicated while dynamically loaded.
2. A dynamic load for testing regulated power supplies as set forth in claim 1 wherein said portion of said series circuit comprises said power resistor.
3. A dynamic load for testing regulated power supplies as set forth in claim 1 wherein said portion of said series circuit comprises said current regulated power supply.
4. A dynamic load for testing regulated power supplies as set forth in claim 1 and including a two position switch adapted in one position to connect said voltage regulated power supply across said power resistor and in the other position to connect said voltage regulated power supply across said current regulated power supply.
5. A dynamic load for testing regulated power supplies as set forth in claim 1 wherein said current regulated power supply and said voltage regulated power supply are remotely programmable.
6. A dynamic load for testing regulated power supplies as set forth in claim 1 wherein said current regulated and said voltage regulated power supply include remote programming circuit connections and remote programming means remotely located and connected to said circuit connections for remote dynamic load testing of regulated power supplies.

No references cited.

RUDOLPH V. ROLINEC, *Primary Examiner.*

E. L. STOLARUN, *Assistant Examiner.*

UNITED STATES PATENT OFFICE
CERTIFICATE OF CORRECTION

Patent No. 3,406,345                                       October 15, 1968

Sukehiro Ito et al.

It is certified that error appears in the above identified patent and that said Letters Patent are hereby corrected as shown below:

Column 2, line 43, "graph" should read -- graphs --. Column 5, line 18, "O(p)" should read -- Q(p) --. Column 6, line 16, "$P_s'^2 = P_{SR}^2 + kTF \cdot B_N/E_S$" should read -- $\overline{P_s'}^2 = \overline{P_{SR}}^2 + kTF \cdot B_N/E_S$ --; line 49, "$p(P_s')$" should read -- $p(P_s')$ --; line 60, "$S^1N_1$" should read -- $S_1/N_1$ --. Column 7, lines 1, 2 and 6, "$S_1N_1$", each occurrence, should read -- $S_1/N_1$ --; same column 7, line 6, the equation should appear as shown below:

$$(S_1/N_1)_o = \sqrt{E_s/(2\ kTFB_1)P_o} \qquad (16)$$

line 13, "at which the signal to noise ratio $S_1/N_1$ decreases" should read -- at which the signal to noise ratio $S_1/N_1$ decreases by 3 db below the linearly extended value of $(S_1/N_1)_o$, --; line 15, "$(S_1/N_1)_o$" should read -- $(S_1/N_1)_o,)$ --; line 16, "$P_{TH}$/" should read -- $P_{TH}$, --; line 43, "$(N/C_{BsTH} = kTFB_s/E_{TH}$" should read -- $(N/C)_{BsTH} = kTFB_s/E_{TH}$ --; line 47, "$(N/C_{BsTH} = \overline{(P_{TH}}^2 - \overline{P_{SR}}^2)/G$" should read -- $(N/C)_{BsTH} = \overline{(P_{TH}}^2 - \overline{P_{SR}}^2)/G$ --. Column 17, line 39, beginning with "said last mentioned" cancel all to and including "sum of" in line 42, same column 17; line 55, "circuit" should read -- carrier --; line 62, "amplifier" should read -- amplified --;